United States Patent [19]
Butsuen et al.

[11] Patent Number: 5,902,008
[45] Date of Patent: May 11, 1999

[54] DRAINAGE STRUCTURE FOR USE IN SUNROOF APPARATUS

[75] Inventors: Tsukasa Butsuen; Shinichi Nakamori, both of Higashi-Hiroshima; Keisuke Takayama, Wako, all of Japan

[73] Assignee: Daikyo-Webasto Co., Ltd., Higashi-Hiroshima, Japan

[21] Appl. No.: 08/810,769

[22] Filed: Mar. 5, 1997

[30] Foreign Application Priority Data

Mar. 6, 1996 [JP] Japan .................................. 8-049200

[51] Int. Cl.⁶ ............................................................ B60J 7/00
[52] U.S. Cl. .......................................... 296/213; 296/208
[58] Field of Search .................................... 296/208, 213, 296/221–223

[56] References Cited

U.S. PATENT DOCUMENTS 4,844,532   7/1989   Ono et al. ................................ 296/213
5,466,038   11/1995  Fujie et al. .............................. 296/213

FOREIGN PATENT DOCUMENTS

63-222923   9/1988   Japan .
6-336117    12/1994  Japan .

*Primary Examiner*—Dennis H. Pedder
*Attorney, Agent, or Firm*—Sixbey, Friedman, Leedom & Ferguson; David S. Safran

[57] ABSTRACT

A drainage structure for use in a sunroof apparatus is provided including a pair of drain drips (7) respectively attached to one ends of a pair of longitudinally extending opposite guide rails (3) of the sunroof apparatus mounted on a vehicle roof (2), the pair of drain drips (7) each having a drain path portion (9) and a communication path portion (11), the respective communication path portions (11) of the pair of drain drips (7) being interconnected through a communication tube (10) and oriented toward a transversely central side of the vehicle roof (2). With this drainage structure, even when water flows from an upper one of the drain drips (7) to a lower one of the drain drips (7) due to tilting of the vehicle to the right and left, the water is less likely to flow into a lower one of the guide rails (3) and hence is prevented from leaking into the inside of the vehicle.

15 Claims, 10 Drawing Sheets

DRAINAGE STRUCTURE FOR USE IN SUNROOF APPARATUS

BACKGROUND OF THE INVENTION

1. Field of the Invention

The present invention relates to a drainage structure for use in sunroof apparatus.

2. Description of the Related Art

Sunroof apparatus of the tilt type or the tilt-slide type in general include a pair of longitudinally extending right and left guide rails secured to a vehicle roof, and a pair of drive sliders respectively supported and guided by the pair of guide rails for operating an open/close panel so as to open or close the opening defined in the vehicle roof. Water coming from the opening of the vehicle roof is received by a drain groove portion provided in each guide rail, flows through a drain drip located at an end portion of the guide rail and is then discharged to the outside through a drain tube.

In sunroof apparatus of the type adapted to tilt down the panel and then move it rearward, a drip rail is provided for receiving water dropped from a rear portion of the panel and for guiding the received water to a pair of right and left guide rails. The guide rails of sunroof apparatus of this type are elongated longitudinally of the vehicle and have front end portions interconnected through a connecting member defining a drain groove portion and free rear end portions to which a pair of drips are respectively attached.

With such drainage structures, when the vehicle is tilted to the right and left, it is difficult to drain water from one drip that has become higher than the other due to the tilting of the vehicle and, hence, water accumulated in the upper drip and the corresponding guide rail is possible to leak into the inside of the vehicle.

To overcome this drawback, it is conceivable to interconnect the rear ends of the right and left guide rails by means of a member having a drain groove portion. This, however, involves substantial increases in the cost and weight of the apparatus and hence is difficult to employ.

Japanese Unexamined Patent Publication No. SHO 63-222923 discloses a drainage structure wherein right and left drain drips are made to communicate with each other by means of a communication tube such as a hose so as to allow water to flow from an upper one of the drips to a lower one through the communication tube and to be discharged from the lower drip when the vehicle is tilted to the right and left.

In this prior art structure, however, since a communication path portion and a drain path portion rearwardly protrude from each drip and are connected to the communication tube and drain tube, respectively, water flowing down to the lower drip from the upper drip through the communication tube enters the lower drip from the rear side, flows toward the corresponding guide rail against the normal drainage stream, and then flows reversely so as to be discharged through the rearwardly oriented drain path portion. Thus, it is possible that the water overflows at the lower drip and the corresponding guide rail, resulting in a difficulty in providing a smooth flow of water.

SUMMARY OF THE INVENTION

An important object of the present invention is to provide a drainage structure for use in a sunroof apparatus wherein respective communication path portions of right and left drips are oriented toward a transversely central side of the vehicle roof so as to face opposite to each other thereby decreasing the flow of water from an upper one of the drips into a lower one of guide rails against the normal drainage stream when the vehicle is tilted to the right and left.

Another important object of the present invention is to provide a drainage structure for use in a sunroof apparatus wherein right and left drips each comprise a drip body and a two-branched pipe connected to the drip body, and one branch of the two-branched pipe forms a communication path portion oriented toward a transversely central side of the vehicle roof, thereby decreasing the flow of water from an upper one of the drips into the drip body of a lower one and allowing water to be smoothly discharged from the drip body to the two-branched pipe.

Another object of the present invention is to provide a drainage structure for use in a sunroof apparatus wherein right and left drips each have a drain path portion and a communication path portion which are substantially aligned on a transversely extending straight line thereby allowing water flowing from an upper position to a lower position through the communication path portion of a lower one of the drips to be smoothly discharged from the corresponding lower drain path portion.

Yet another object of the present invention is to provide a drainage structure for use in a sunroof apparatus wherein right and left drips each have a communication path portion upwardly inclined toward a transversely central side of the vehicle roof, while a communication tube is positioned to assume a convex configuration, thereby preventing water from remaining in the communication path portion.

Still another object of the present invention is to provide a drainage structure which allows drips to be manufactured easily with less costs and simplifies and ensures the mounting of the drips and a communication tube.

These and other objects, features and attendant advantages of the present invention will be more fully appreciated from the following detailed description to be read in conjunction with the accompanying drawings.

DESCRIPTION OF THE PREFERRED EMBODIMENTS

The present invention will now be described in detail by way of the preferred embodiments thereof with reference to the drawings.

Figure 4:
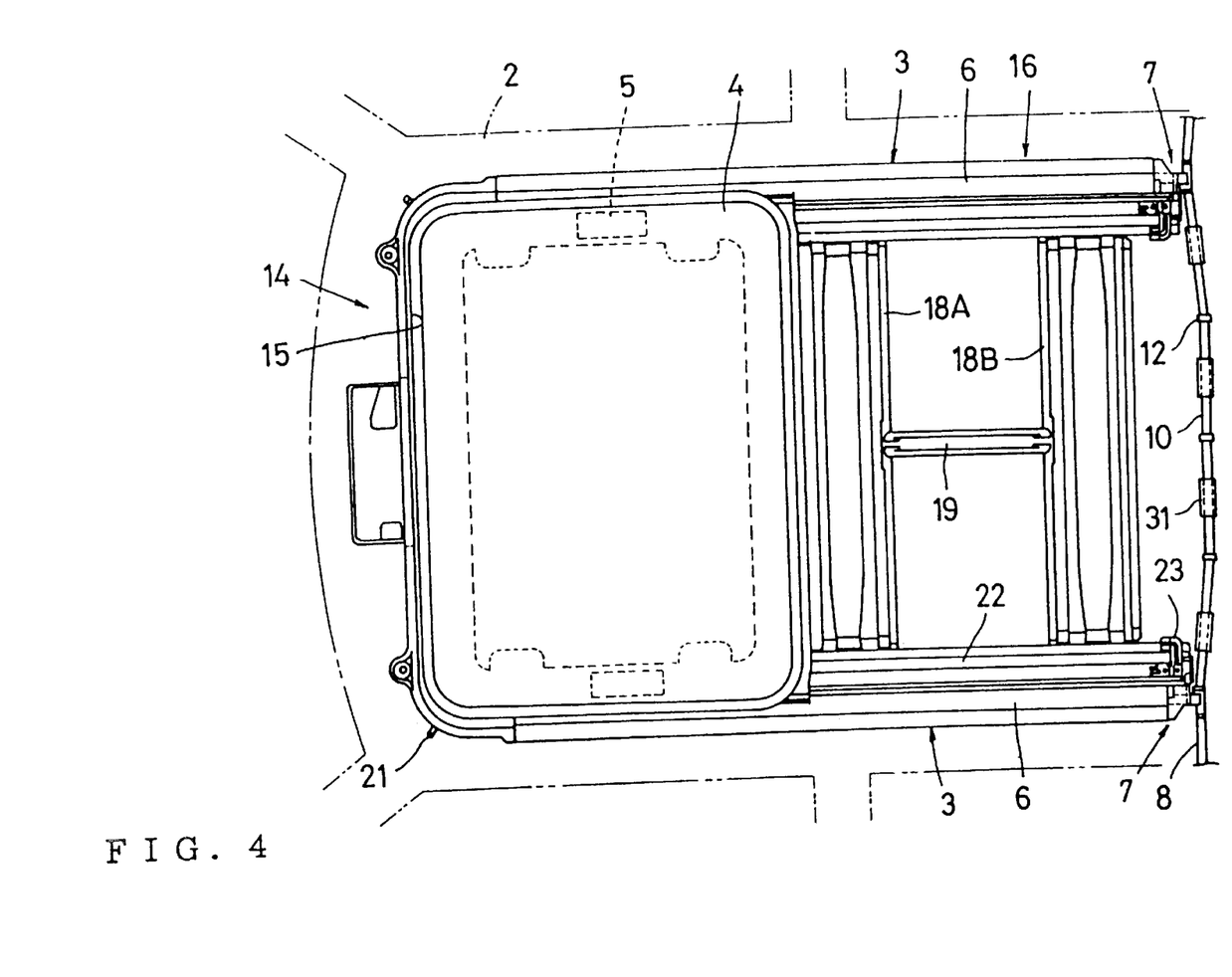
FIG. 4 is a plan view showing an overall sunroof apparatus.
Figure 5:
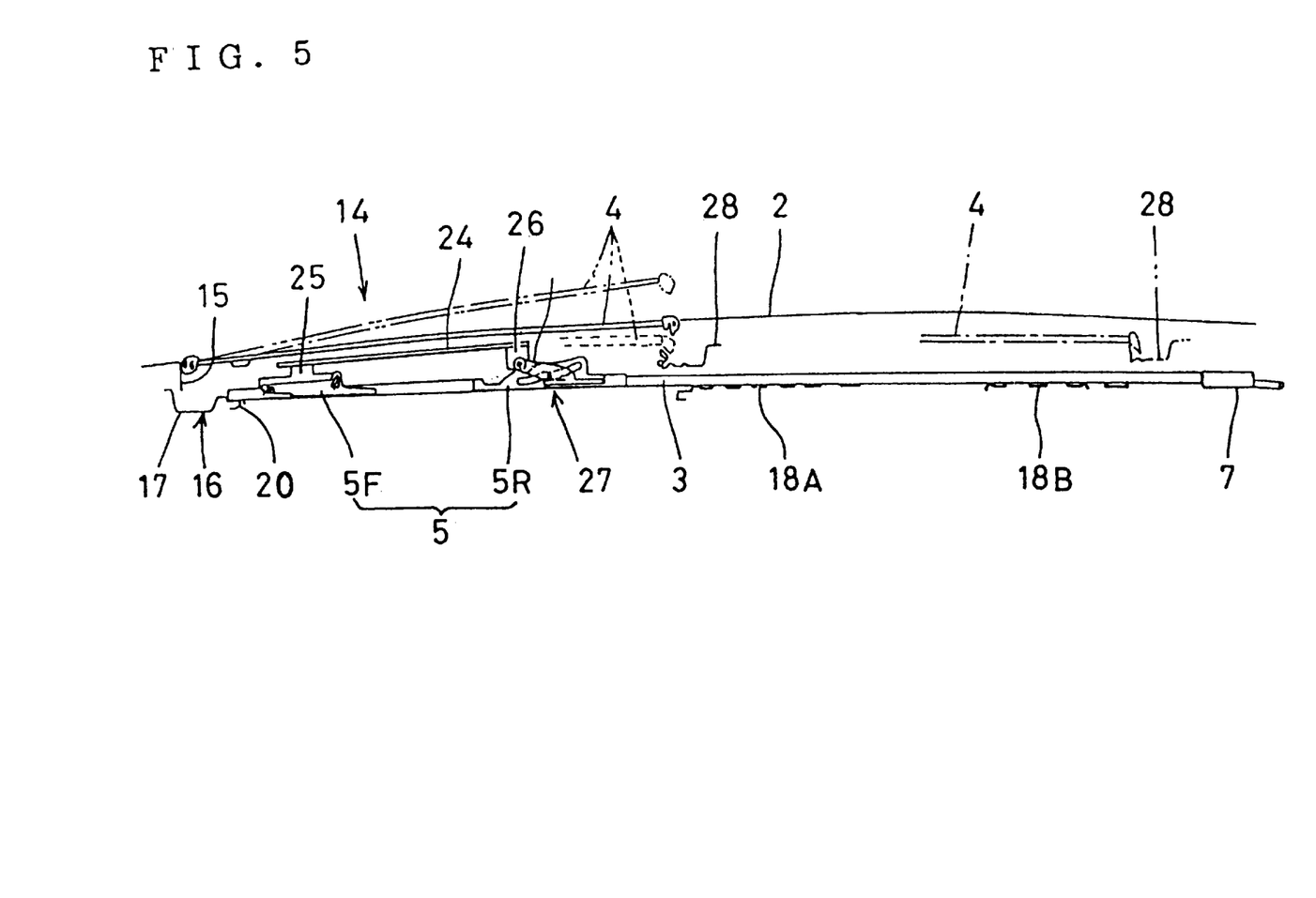
FIG. 5 is a sectional side view of the overall sunroof apparatus.
Figure 8:
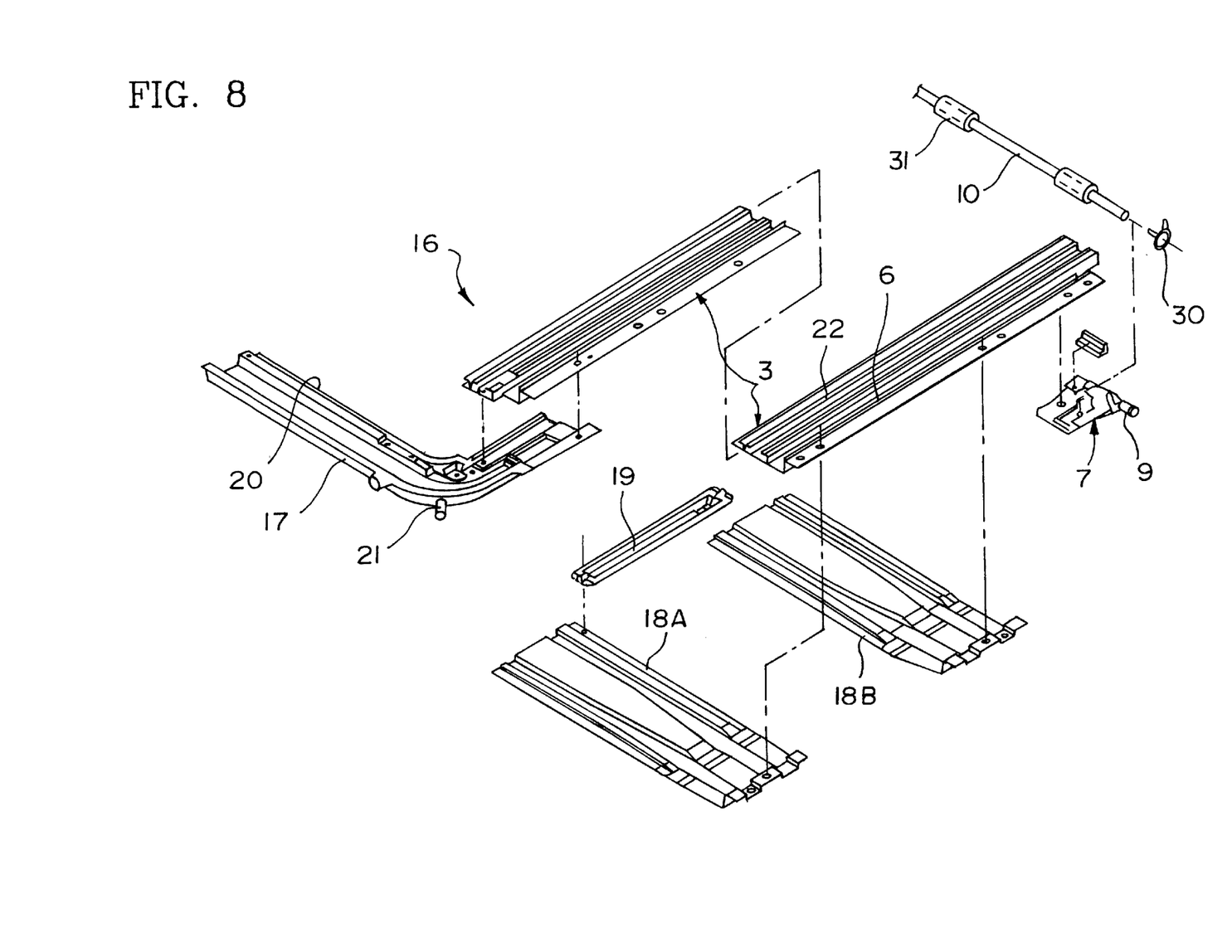
FIG. 8 is an exploded perspective view of a guide rail and a drip.

Referring to FIGS. 4, 5 and 8, a sunroof apparatus 14 mounted on a vehicle roof 2 is adapted to open/close an opening portion defined in the roof 2 by tilting and sliding a panel 4. The panel 4 is formed of transparent glass, a synthetic resin or a like material.

On the underside of the vehicle roof 2 is mounted a frame 16 which is a frame assembly including a plurality of members assembled together. The frame 16 comprises a pair of longitudinally extending right and left guide rails 3, a front frame 17 having right and left ends connected to the respective front ends of the right and left guide rails 3, fore and rear reinforcement members 18A and 18B interconnecting the right and left guide rails 3 at longitudinally intermediate portions and rear portions, respectively, of the guide rails 3, and an intermediate reinforcement member 19 interconnecting the fore and rear reinforcement members 18A and 18B.

The space defined by the front frame 17, right and left guide rails 3 and fore reinforcement member 18A is an inner opening portion 20 to be opened/closed with a sunshade.

The front frame 17 is attached with a drive mechanism for rotating a gear by means of a motor or a handle so as to push-pull operate a cable engaging the gear, and is formed with front drain portions 21 at right and left ends thereof.

The guide rails 3 are each formed with a guide groove portion 22 and a drain groove portion 6, and other portions not shown such as a drive cable groove portion through which the cable extends and a sunshade guide groove portion.

On the guide groove portion 22 of each guide rail 3 is longitudinally slidably supported a drive slider 5 including a front slider 5F and a rear slider 5R which is driven by the drive mechanism through the cable. The guide groove portion 22 has a rear end portion provided with a stopper 23 (shown in FIGS. 1 and 4) setting the rearmost limit of the movement of the drive slider 5.

A bracket 24 is secured to the underside of the panel 4 and has a front and rear support portions 25 and 26. Between the front and rear support portions 25,26 and each drive slider 5 is disposed a raising/lowering mechanism 27 for causing the panel 4 to be tilted by a longitudinal movement of the drive slider 5 and further to slide in a state as tilted down by a longitudinal movement of the drive slider 5.

Described more specifically with reference to FIG. 5, the panel 4 is tilted up with its rear portion raised from the position depicted in solid line (the position fully closing the opening portion) into the position depicted in two-dot chain line by moving the drive slider 5 forward. On the other hand, the panel 4 is tilted down to the position depicted in dotted line from the position depicted in solid line and then moved rearward to the position depicted in single-dot chain line (the position fully opening the opening portion) in the state as tilted down by moving the drive slider 5 rearward.

A drip rail 28 is connected to a rear portion of the raising/lowering mechanism 27. The drip rail 28 is adapted to receive drops of water from the rear edge of the panel 4 and cause the water thus received to flow into the respective drain groove portions 6 of the right and left guide rails 3 when the panel 4 is in a position from the tilted-down position to the position fully opening the opening portion.

In FIGS. 1 to 8, a drip 7 is attached to the rear end of each of the drain groove portions 6 of the right and left guide rails 3. The drip 7 comprises a drip body 7A capable of receiving water from the corresponding drain groove portion 6, a two-branched pipe 7B rearwardly protruding from the drip body 7A, and a mount portion 7C for securing the drip body 7A to the corresponding guide rail 3 with a screw. Although these components of the drip 7 may be separately formed and then assembled together, these are integrally molded with a synthetic resin in this embodiment.

Figure 3:
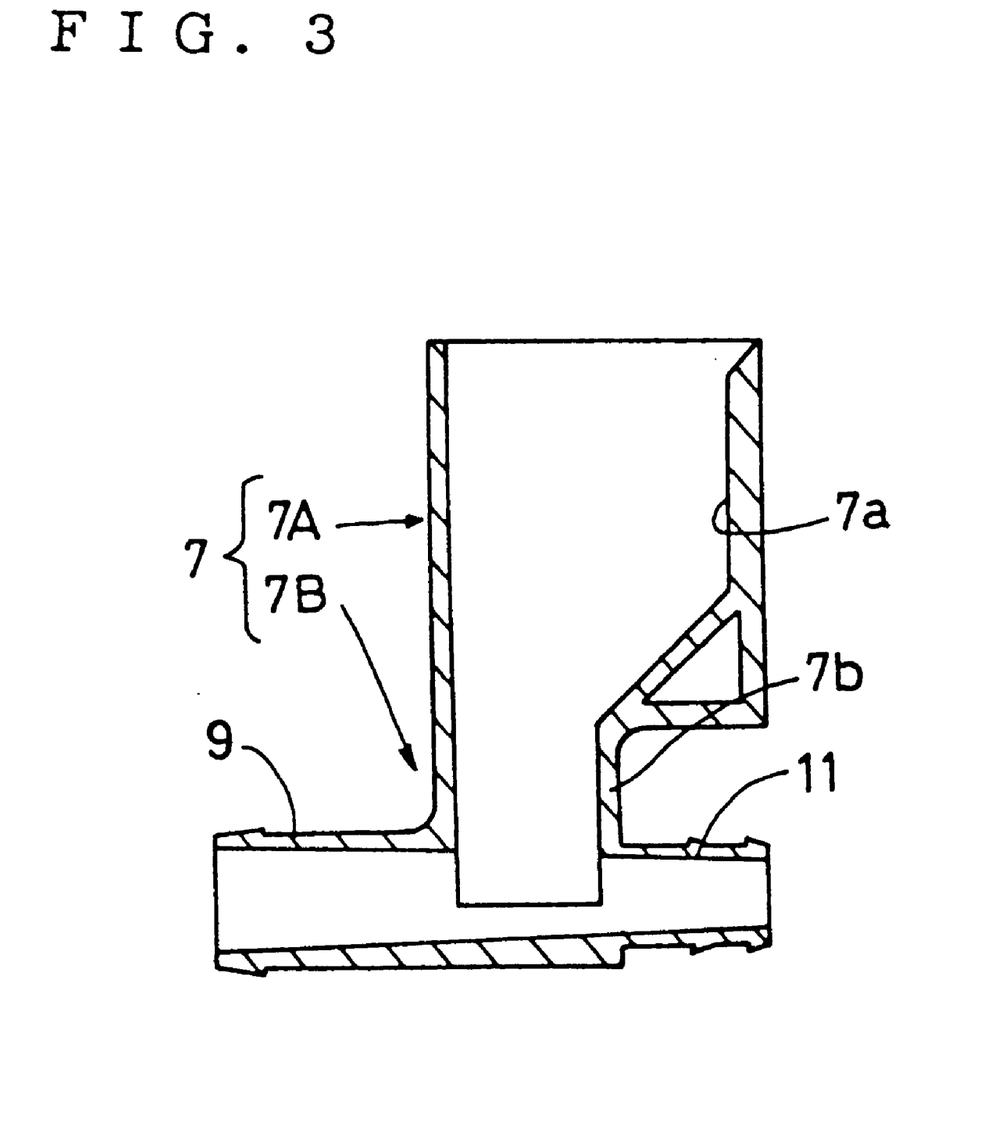
FIG. 3 is a horizontal sectional view of a drip.

The drip body 7A is box-shaped having an opening oriented toward the drain groove portion 6 and a bosom-like water receiving portion 7a defined therein. The two-branched pipe 7B is T-shaped in plan having a connecting portion 7b and a two-branch portion extending perpendicular to the connecting portion 7b, and is inclined rearwardly downward from the rear wall of the drip body 7A.

The connecting portion 7b of the two-branched pipe 7B is connected to the drip body 7A with a rearwardly downward inclination and defines therein a communication path narrower than the water receiving portion 7a. The two-branch portion connected to the rear end of the connecting portion 7b extends substantially straight transversely of the vehicle roof 2, with its one branch oriented outwardly of the vehicle roof 2 to form a drain path portion 9 and the other branch oriented toward a transversely central side of the vehicle roof 2 to form a communication path portion 11.

The drain path portion 9 defines therein a drain path communicating with the water receiving portion 7a through the connecting portion 7b and connects to a drain tube 8 comprising for example a rubber hose. The drain path portion 9 serves to discharge water flowing into the water receiving portion 7a to the outside of the vehicle through the drain tube 8.

The communication path portion 9 defines therein a communication path communicating with the water receiving portion 7a and also communicating with the drain path which is aligned substantially linearly with the communication path.

Figure 1:
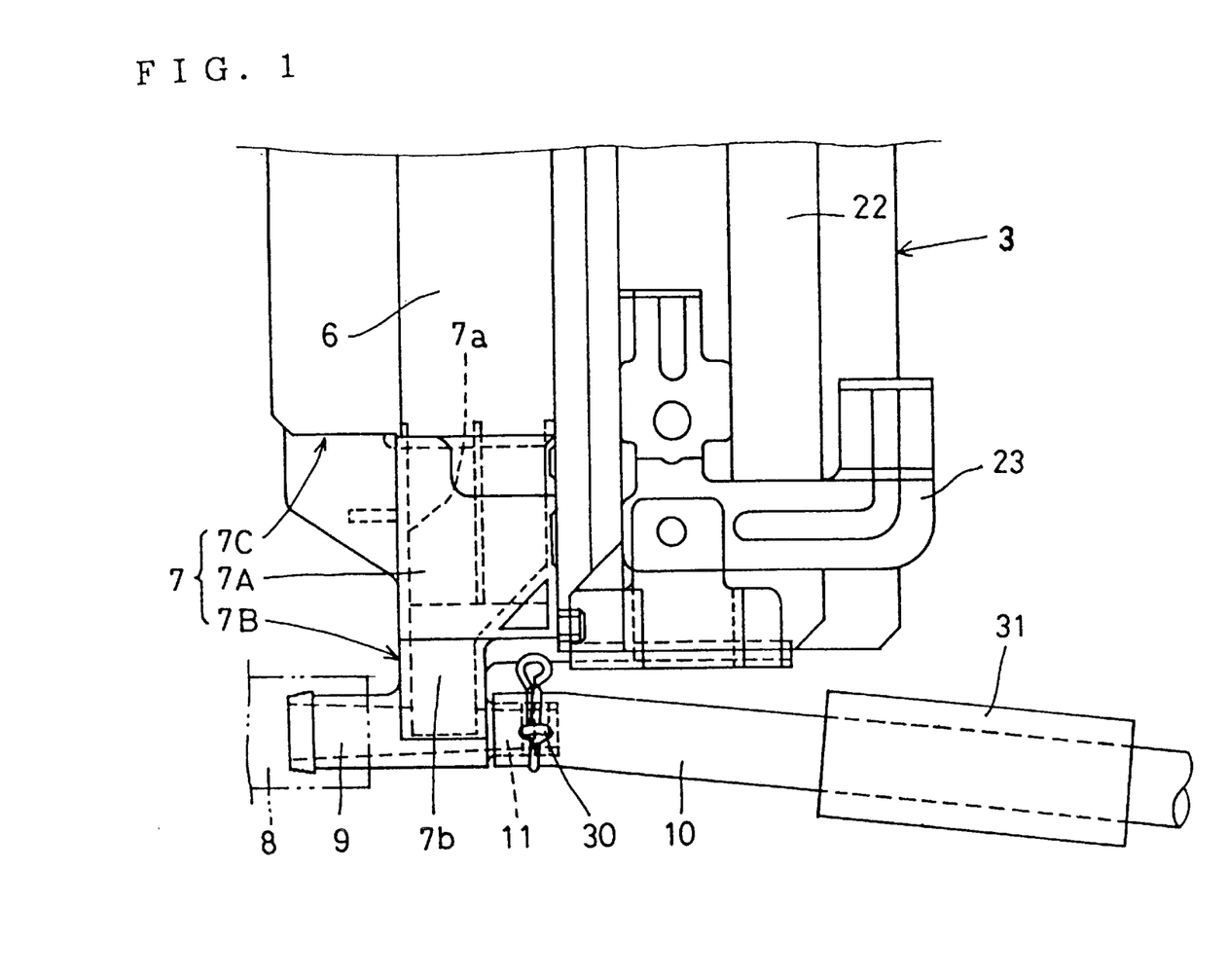
FIG. 1 is a plan view showing a principal part of one embodiment of the present invention.
Figure 2:
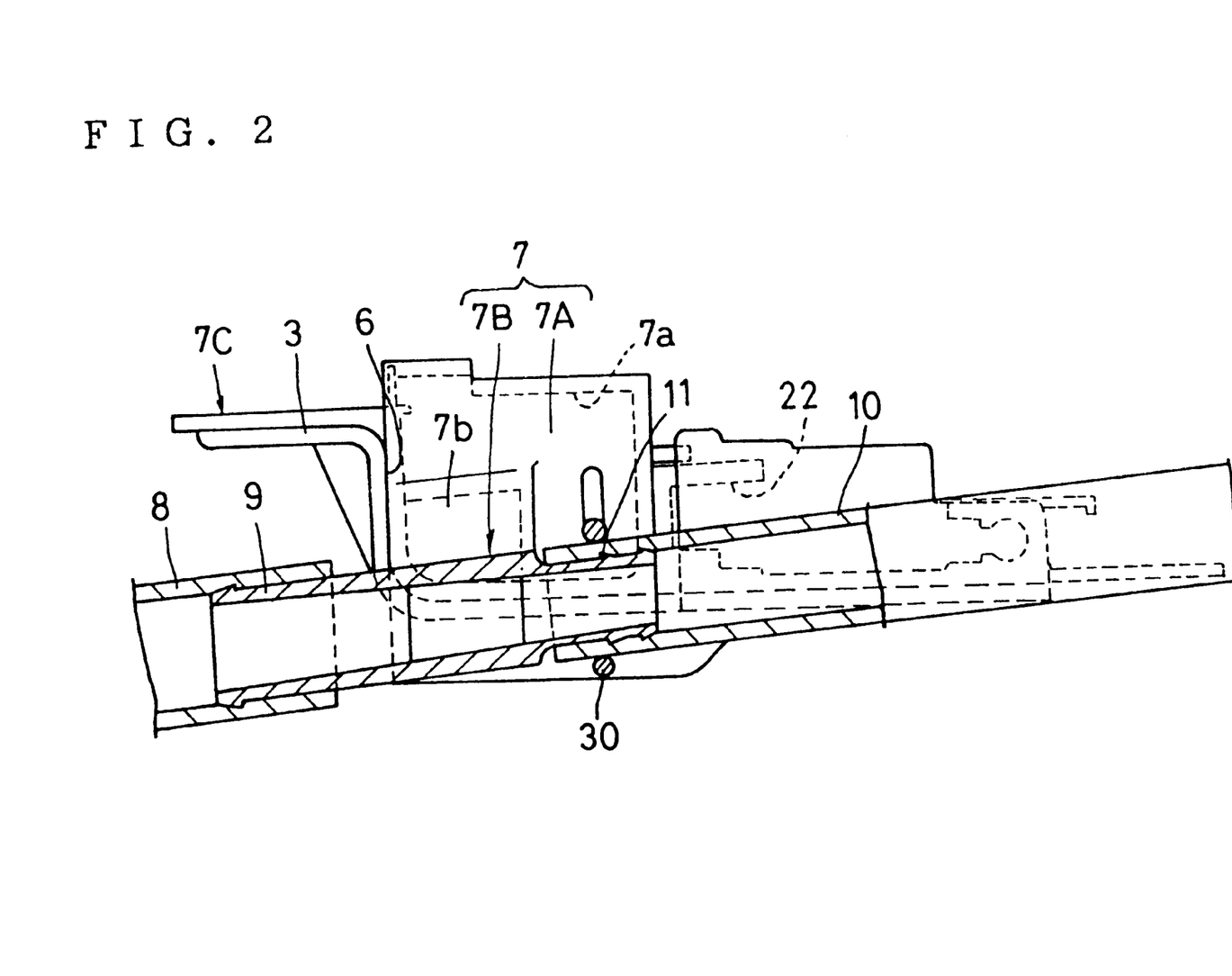
FIG. 2 is a rear view, partly in section, of the principal part.

The communication path portion 11 is connected to a communication tube 10 comprising a rubber hose, a metal pipe or the like and is fastened thereto with a clip 30. The communication tube 10 interconnects the respective communication path portions 11 of the right and left drips 7, so that when one of the drips 7 is raised relative to the other due to tilting of the vehicle to the right and left, water is caused to flow through the communication tube 10 from the upper drip to the lower drip.

The two-branch portion including the drain path portion 9 and communication path portion 11 which are aligned substantially straight with each other is, in rear view, slightly upwardly inclined toward the transversely central side of the vehicle roof 2 so as to prevent water to stagnate in each component. It should be noted that the two-branched pipe 7B may have an alternative feature such that only the communication path portion 11 is inclined upward.

Figure 6:
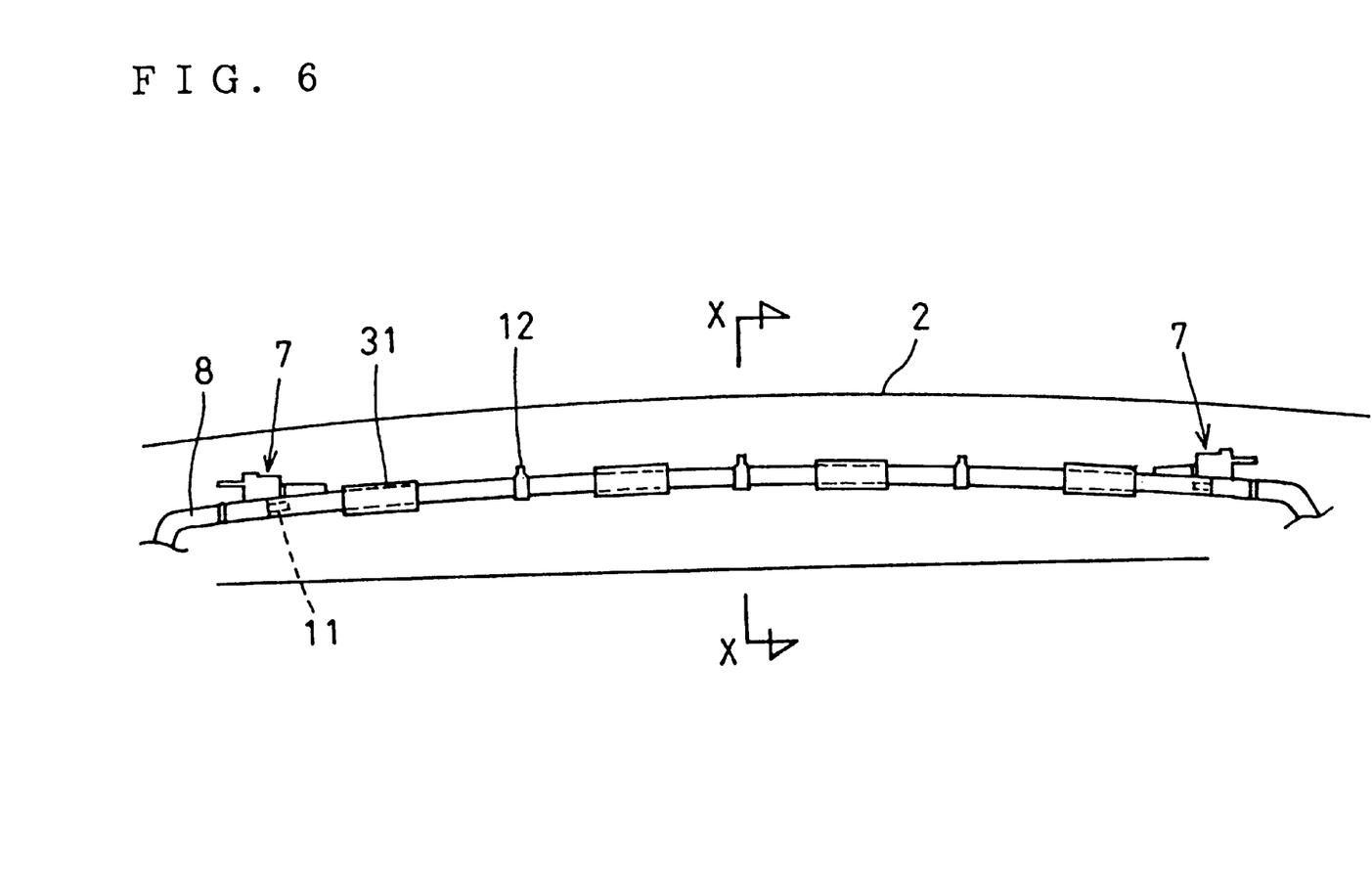
FIG. 6 is a rear view of the overall sunroof apparatus.
Figure 7:
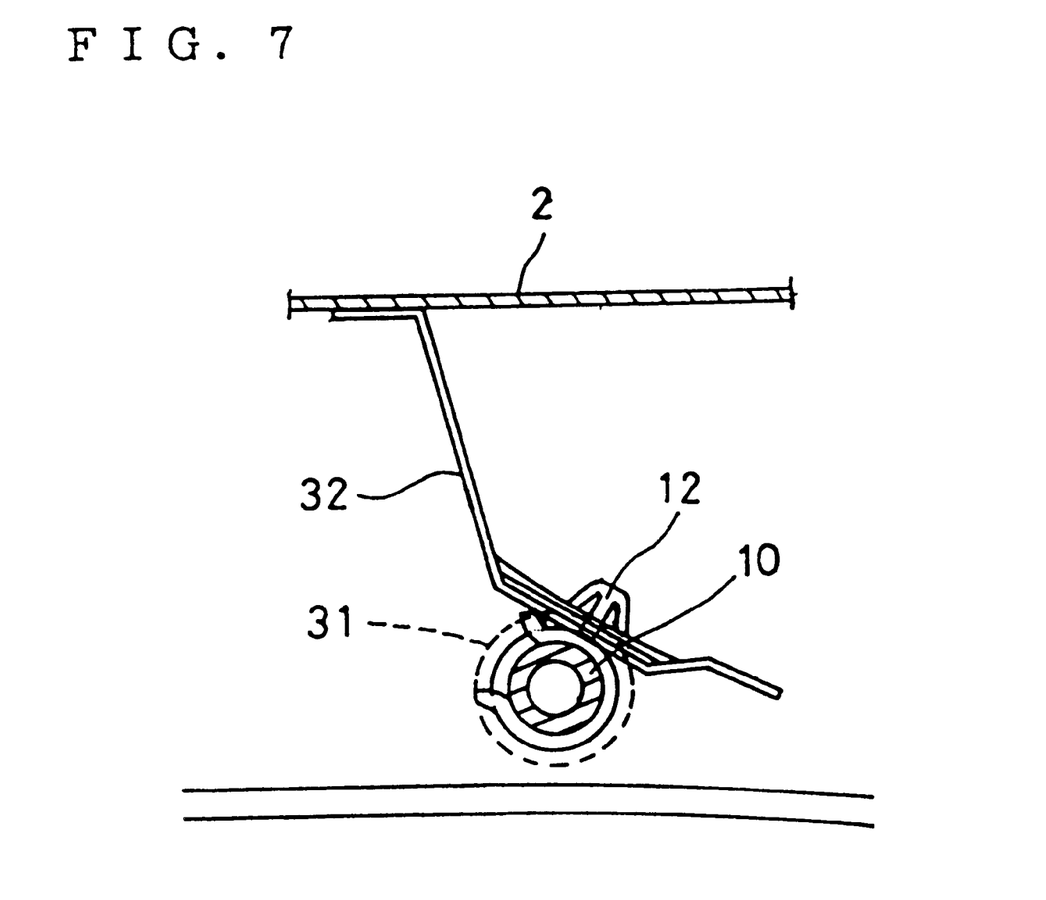
FIG. 7 is a sectional view taken along line X—X of FIG. 6.

A plurality of anchoring members 12 and a plurality cushion members 31 are fitted around the communication tube 10. The communication tube 10 is secured to a mounting bracket (roof stiffener) 32 by the anchoring members 12 with the cushion members 31 abutting the mounting bracket 32, whereby the communication tube 10 is fixed to the vehicle roof 2 as extending substantially conformal to the convex shape of the vehicle roof 2 and prevented from shaking.

The upward inclination of the two-branch portion including the drain path portion 9 and the communication path portion 11 in combination with the convex configuration of the communication tube 10 allows water to flow smoothly from the communication tube 10 through the communication path portion 11 to the drain path portion 9.

The communication tube 10 may be mounted in such a manner that a bracket is disposed so as to protrude rearward from the rear reinforcement member 18B and the communication tube 10 is secured to the bracket by the anchoring members 12 with the cushion members 31 abutting the bracket so as to extend convexly along the vehicle roof 2. With this construction it is possible to previously incorporate an assembly of the drips 7 and communication tube 10 into the sunroof apparatus 14.

In the embodiment thus described, the drainage structure is of the construction in which: the pair of longitudinally extending right and left guide rails 3 are secured to the vehicle roof 2 for supporting and guiding corresponding drive sliders 5 adapted to operate the panel 4 so as to open/close the opening portion 15 defined in the vehicle roof 2; the drain groove portions 6 are respectively formed in the pair of guide rails 3; the pair of right and left drain drips 7 are respectively attached to rear ends of the guide rails 3 and each have the drain path portion 9 and the communication path portion 11; the drain path portion 9 is connected to the drain tube 8; the communication tube 10 interconnects the respective communication path portions 11 of the pair of drain drips 7; and the respective communication path portions 11 of the pair of drain drips 7 are oriented toward the transversely central side of the vehicle roof 2.

With this construction, when the vehicle is tilted to the right and left to cause water to flow from an upper one of the drips 7 to a lower one through the communication tube 10, the water enters the lower drip 7 from the transverse direction and is discharged therefrom through the drain path portion 9, so that the water is hard to flow into a lower one of the longitudinally extending guide rails 3. Consequently, the flow of water into the lower guide rail 3 against the normal drainage stream is decreased and, hence, leakage of water into the inside of the vehicle can be satisfactorily prevented. Since the direction of water flowing into the communication path portion 11 from the communication tube 10 is perpendicular to the direction the flow from the drip 7 toward the corresponding guide rail 3 against the normal drainage stream, water is hard to flow from the communication path portion 11 toward the guide rail 3.

If the communication path portions 11 of the pair of drips 7 are each upwardly oriented toward the transversely central side of the vehicle roof 2, water in each communication path portion 11 can be discharged more easily, thus ensuring reliable drainage with less stagnation of water.

The pair of drips 7 each comprise the drip body 7A attached to the corresponding guide rail 3 and the two-branched pipe 7B connected to the drip body 7A, one of the two branches of the pipe 7B forming the communication path portion 11, the other branch forming the drain path portion 9. With this feature, water entering a lower one of the drips 7 through the communication tube 10 due to tilting of the vehicle is less likely to flow into the drip body 7A, hence, into the corresponding lower guide rail 3 against the normal drainage stream, so that leakage of water into the inside of the vehicle is assuredly prevented.

If the drip body 7A and the two-branched pipe 7B are integrally connected together by molding, the drip 7 can be simply and inexpensively manufactured with a decreased number of parts and can be handled with less difficulty.

The two-branched pipe 7B has the connecting portion 7b connected to the drip body 7A and inclined rearwardly downward therefrom, and the communication path portion 11 and the drain path portion 9 are connected to the rear end of the connecting portion 7b. This feature allows water to flow from the drip body 7A to the two-branched pipe 7B smoothly while making it difficult to flow from the two-branched pipe 7B to the drip body 7A. Consequently, the flow of water entering the corresponding lower guide rail 3 is decreased, thereby 13, satisfactorily preventing leakage of water.

The communication path portion 11 and drain path portion 9 of the two-branched pipe 7B are substantially aligned on a transversely extending straight line while extending perpendicular to the connecting portion 7b to form a T-shaped configuration. This feature allows water entering a lower one of the drips 7 through the communication tube 10 to flow to the drain path portion 9 substantially linearly without flowing into the drip body 7A, so that leakage of water into the inside of the vehicle is more assuredly prevented by virtue of smooth drainage.

Since the right and left drips 7 each have the mount portion 7C, it is possible to attach the drip body 7A to the corresponding guide rail 3 easily without necessity of attaching the drip body 7A directly to the guide rail 3.

If the communication tube 10 is positioned as raised on the transversely central side of the vehicle roof 2 and lowered on the transverse end sides of the vehicle roof 2, water in the communication tube 10 necessarily flows to either one of the drips 7 thereby preventing water from stagnating in the communication tube 10.

Where the anchoring members 12 fixed to the vehicle roof 2 anchor the communication tube 10, it is possible to securely position the communication tube 10 with less possibility of shaking due to shaking of the vehicle traveling and to firmly hold the posture of the communication tube 10 as mounted.

The cushion members 31 fitted around the communication tube 10 can prevent the communication tube 10 from contacting the vehicle roof 2 even if the communication tube 10 partially shakes, thereby avoiding any damage to the communication tube 10.

Figure 9:
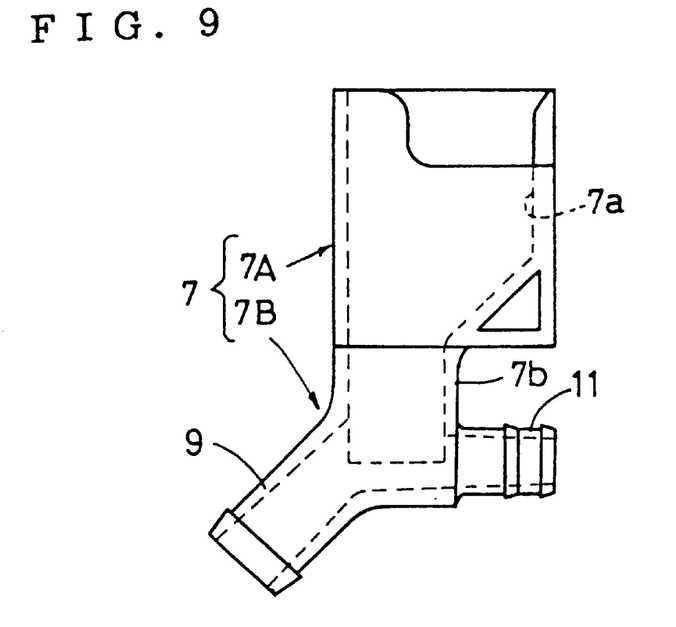
FIG. 9 is a plan view showing a first variation of the drip.

FIG. 9 shows a first variation of the drip 7. In this variation drain path portion 9 is not linearly aligned with communication path portion 11 but is slanted rearwardly outward from the connecting portion 7b (i.e., extending rearward and transversely outward from the connecting portion 7b).

However, the communication path portion 11 is substantially linearly connected to the connecting end portion of the drain path portion 9 and, hence, water flowing from the communication path portion 11 oriented toward the transversely central side of the vehicle is guided to the drain path portion 9 smoothly without influencing water in the water receiving portion 7a, i.e., without flowing toward the corresponding guide rail 3 against the normal drainage stream.

Figure 10:
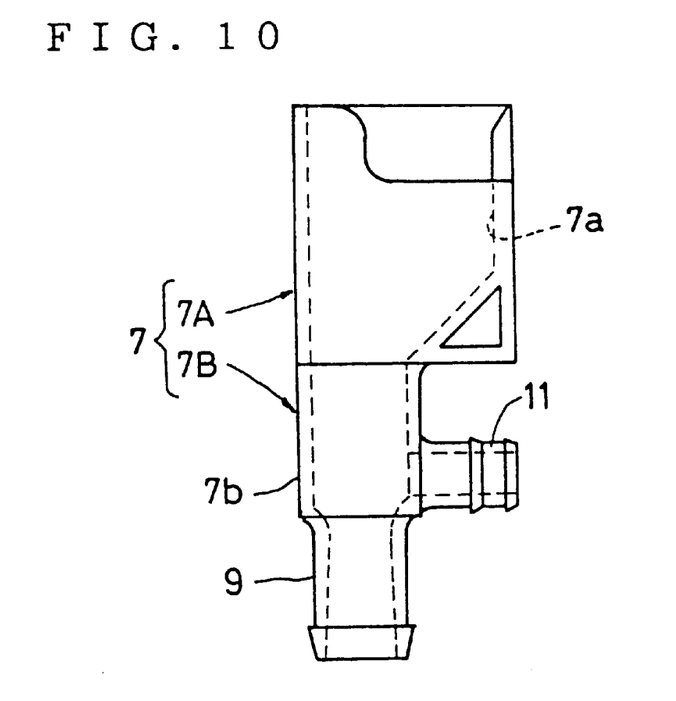
FIG. 10 is a plan view showing a second variation of the drip.

FIG. 10 shows a second variation of the drip 7. In this variation drain path portion 9 is oriented rearward and substantially linearly aligned with the connecting portion 7b of the two-branched pipe 7B so as to facilitate the discharge of water flowing into the drip body 7A from the corresponding guide rail 3.

The communication path portion 11 oriented toward the transversely central side of the vehicle is positioned perpendicular to the connecting portion 7b and drain path portion 9. Since the communication path portion 11 is connected to the connecting portion 7b without directly connecting to the drip body 7A, water from the communication path portion 11 is prevented from flowing into the drip body 7A and the corresponding guide rail 3 against the normal drainage stream.

Figure 11:
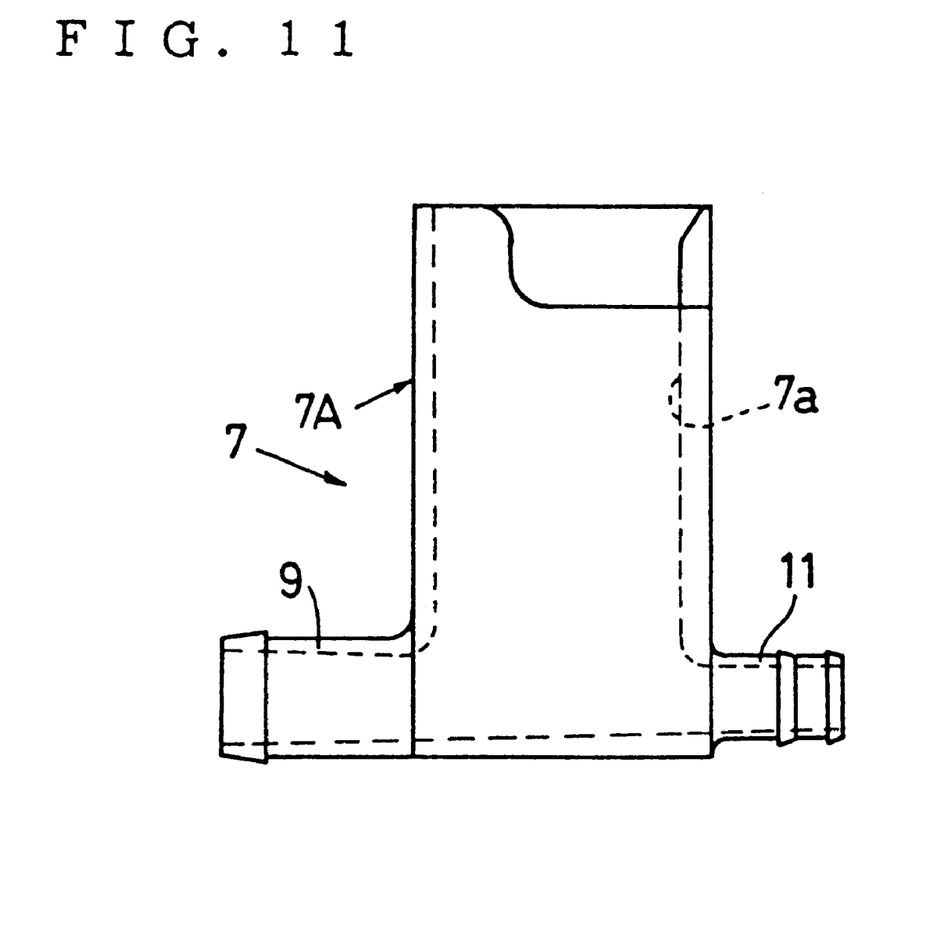
FIG. 11 is a plan view showing a third variation of the drip.

FIG. 11 shows a third variation of the drip 7. In this variation drain path portion 9 and communication path portion 11 protrude directly from right and left lateral sides, respectively, of drip body 7A and are substantially aligned on a transversely extending straight line with intervention of water receiving portion 7a of the drip body 7A therebetween. Although water from the communication path portion 11 passes through the water receiving portion 7a, the flow of the water is directed to the drain path portion 9 smoothly without being directed toward the guide rail side because the direction of such flow is perpendicular to that of the flow toward the guide rail 3.

While the presently preferred embodiments of the present invention have been described in detail, as will be apparent with those familiar with the art, various variations and modifications can be made within the scope of the invention. For example, the sunroof apparatus 14 may be of the type in which the panel 4 is merely tiltable, or the panel 4 is rearwardly movable after it is tilted up, or of a like type. Further, a construction is possible such that the frame 16 does not have the front frame 17 and another pair of right and left drips 7 are attached to the respective front ends of the pair of guide rails 3 and interconnected through another communication tube 10. Furtheron, each guide rail 3 may be constructed by forming the guide groove portion 22 for supporting the corresponding drive slider 5 and the drain groove portion 6 separately and then firmly joining these portions 22 and 6 together.

What is claimed is:

1. A drainage structure for use in a sunroof apparatus in which a pair of longitudinally extending opposite guide rails are secured to a vehicle roof for supporting and guiding corresponding drive sliders adapted to operate a panel so as to open/close an opening portion defined in the vehicle roof, the drainage structure comprising drain groove portions respectively formed in the pair of guide rails, a pair of drain drips respectively attached to one end of each of the guide rails and each including a drain path connector portion, a communication path connector portion, and a water receiving portion, the water receiving portion being connected to the drain groove portions and communicating with the drain path connector portion, the drain path connector portion being connected to a drain tube, and a communication tube interconnecting the respective communication path connector portions of the pair of drain drips, the communication path connector portions of the pair of drain drips being oriented toward a transversely central area of the vehicle roof so that open ends of the communication path connector portions substantially face each other, and a flow path directly connecting each of the communication path connector portions to a corresponding drain path connector portion in a bypassing relationship relative to said drain groove portions so as to allow water in the communication tube to flow directly from the communication path connector portion to the corresponding drain path connector portion without entering the drain groove portions.

2. A drainage structure as set forth in claim 1, wherein the communication path connector portions are slightly upwardly inclined toward the transversely central area of the vehicle roof.

3. A drainage structure as set forth in claim 1, wherein the pair of drain drips each further include a drip body fixed to the corresponding guide rail and containing said water receiving portion, and a substantially T-shaped two-branched pipe having a connecting portion and two branches, the two-branched pipe being connected to the drip body via the water receiving portion thereof, one of the two branches of the two-branched pipe forming the communication path connector portion, and the other of the two branches forming the drain path connector portion.

4. A drainage structure as set forth in claim 3, wherein the drip body and the two-branched pipe are integrally connected together.

5. A drainage structure as set forth in claim 3, wherein the connecting portion of the two-branched pipe is connected to the drip body and inclined rearwardly downward therefrom, the connecting portion having a rear end connected to the communication path connector portion and the drain path connector portion.

6. A drainage structure as set forth in claim 5, wherein the communication path connector portion and the drain path connector portion of the two-branched pipe are substantially aligned on a transversely extending straight line and extend perpendicular to the connecting portion.

7. A drainage structure as set forth in claim 5, wherein the connecting portion and the drain path connector portion of the two-branched pipe are substantially aligned on a longitudinally extending straight line.

8. A drainage structure as set forth in claim 5, wherein the drain path connector portion is slanted rearward and transversely outward from the rear end of the connecting portion.

9. A drainage structure as set forth in claim 3, wherein the pair of drain drips each further including a mount portion for attaching the drip body to the corresponding guide rail.

10. A drainage structure as set forth in claim 1, wherein the pair of drain drips each have a drip body defining said water receiving portion therein and having opposite lateral sides from which the drain path connector portion and the communication path connector portion respectively protrude, and the drain path connector portion and the communication path connector portion are substantially aligned on a transversely extending straight line with intervention of the water receiving portion therebetween.

11. A drainage structure as set forth in claim 1, wherein the communication tube is positioned as raised on the transversely central side of the vehicle roof and as lowered on transverse end sides of the vehicle roof.

12. A drainage structure as set forth in claim 11, the communication tube is anchored by an anchoring member secured to the vehicle roof.

13. A drainage structure as set forth in claim 12, wherein the communication tube is fitted into a cushion member.

14. A drainage structure for use in a sunroof apparatus in which a pair of longitudinally extending opposite guide rails are secured to a vehicle roof for supporting and guiding corresponding drive sliders adapted to operate a panel so as to open/close an opening portion defined in the vehicle roof, the drainage structure comprising drain groove portions respectively formed in the pair of guide rails, a pair of drain drips respectively attached to rear ends of the guide rails and each including a drain path portion and a communication path portion, the drain path connector portion being connected to a drain tube, and a communication tube interconnecting the respective communication path portions of the pair of drain drips, the pair of drain drips each further including a drip body fixed to the corresponding guide rail and a two-branched pipe integrally connected to the drip body by molding, the two-branched pipe having two branches substantially aligned on a transversely extending straight line, one being oriented and inclined toward a transversely central side of the vehicle roof to form the communication path portion, the communication tube being anchored by an anchoring member secured to the vehicle roof so as to be positioned as raised on the transversely central side of the vehicle roof and as lowered on transverse end sides of the vehicle roof.

15. A drainage structure as set forth in claim 14, wherein: the sunroof apparatus further comprises a front frame interconnecting front ends of the pair of the guide rails, reinforcement members interconnecting intermediate portions and rear portions, respectively, of the pair of guide rails, front and rear supports provided on the panel, and a pair of raising/lowering mechanisms each disposed between the front and rear supports and each of the drive sliders for causing the panel to be tilted by a longitudinal movement of the sliders and further causing the panel to slide in a state as tilted down by a longitudinal movement of the sliders; and the drainage structure further comprises a pair of front drain portions provided on the front frame, and a drip rail connected to respective rear portions of the pair of raising/lowering mechanisms.

* * * * *

UNITED STATES PATENT AND TRADEMARK OFFICE
CERTIFICATE OF CORRECTION

PATENT NO.      : 5,902,008
DATED           : May 11, 1999
INVENTOR(S)     : Tsukasa Butsuen et al.

Page 1 of 1

It is certified that error appears in the above-identified patent and that said Letters Patent is hereby corrected as shown below:

Title page,
Replace Item "[73] Assignee: Daikyo-Webasto Co., Ltd..
                            Higashi-Hiroshima, Japan"

with the following:

-- [73] Assignee: Daikyo-Webasto Co., Ltd..
            Higashi-Hiroshima, Japan, and
            Honda Giken Kogyo Kabushiki Kaisha
            Tokyo, Japan --

Signed and Sealed this

Twentieth Day of November, 2001

*Attest:*

*Nicholas P. Godici*

NICHOLAS P. GODICI
*Attesting Officer*       *Acting Director of the United States Patent and Trademark Office*